Jan. 1, 1957 A. H. MAYNARD 2,775,764
STAPLING MACHINE
Filed March 10, 1954 3 Sheets-Sheet 1

Inventor:
Arthur H. Maynard
By
Attorneys.

Inventor:
Arthur H. Maynard
By
Attorneys.

Jan. 1, 1957 — A. H. MAYNARD — 2,775,764
STAPLING MACHINE
Filed March 10, 1954 — 3 Sheets-Sheet 3
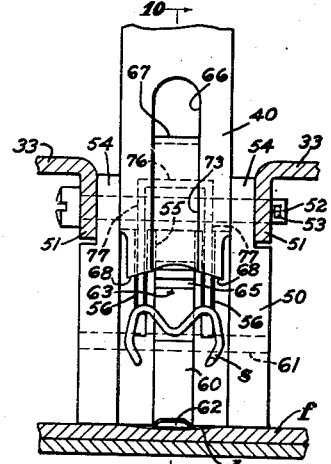
Fig. 6.
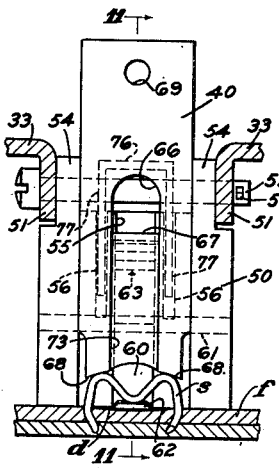
Fig. 7.
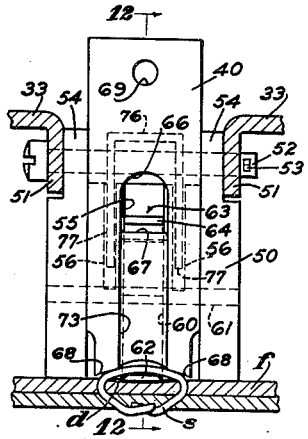
Fig. 8.
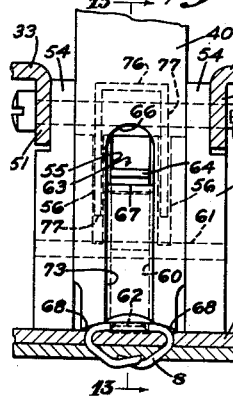
Fig. 9.
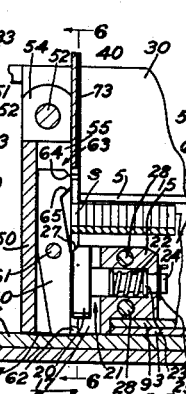
Fig. 10.
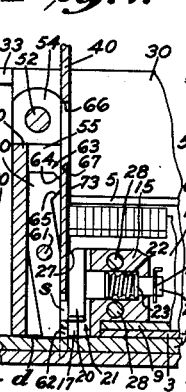
Fig. 11.
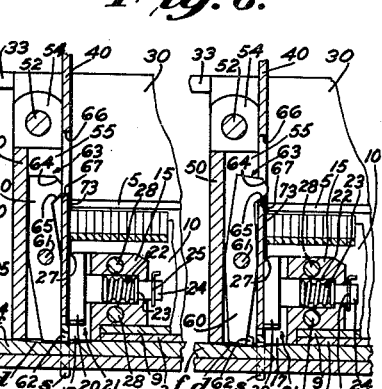
Fig. 12. Fig. 13.
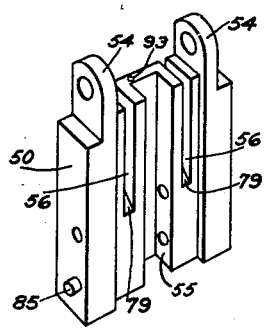
Fig. 14.
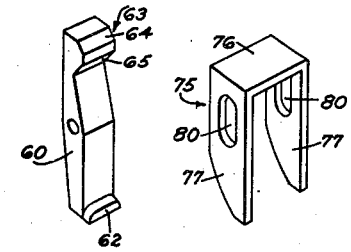
Fig. 15. Fig. 16.
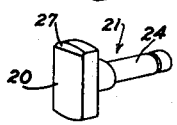
Fig. 18.
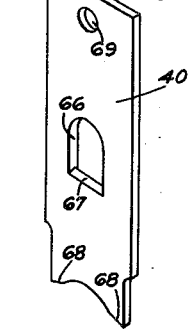
Fig. 17.
Inventor:
Arthur H. Maynard
By Kenyon and White
Attorneys.

United States Patent Office 2,775,764
Patented Jan. 1, 1957

2,775,764

STAPLING MACHINE

Arthur H. Maynard, Westerly, R. I., assignor to Bostitch, Inc., Stonington, Conn., a corporation of Rhode Island Application March 10, 1954, Serial No. 415,370

9 Claims. (Cl. 1—49)

This invention relates to stapling machines for sealing boxes, cartons or similar containers and consists in means for driving the staples through the folded flaps or other parts of a container and clinching their legs in the interior thereof without the use of an anvil-blade temporarily inserted into the container beneath the flaps.

One object of the invention is to provide improved means for sustaining a staple of the prescribed shape while forcing its legs through or into the material of the carton or container and causing them to be bent toward each other to clinch their ends in overlapping relationship.

Another object is to provide a retractible anvil-member for engaging under the central depending loop of a substantially M-shaped staple as the driver descends and forces its legs through the material to cause them to be bent toward each other to clinch them on the interior of the container either under the lower flaps of the carton or within the material of the flaps without protruding therethrough.

Another object is to provide a machine of the type specified in which staples having legs or prongs of varying length, that is either long or short staples, can be used without adjustment of any part of the machine.

Another object is to provide a pivoted anvil-member having a projecting lip adapted to engage beneath the intermediate loop of the staple to sustain it while its legs are driven into the work, and adapted to be rocked during the descent of the staple-driver to retract the lip from the staple as the legs thereof are finally clinched in overlapping relationship.

Another object is to provide means for opening the front of the machine for clearing the throat through which the staples are driven should it become clogged with a malformed or distorted staple.

Another object is to provide means for preventing the escape of the staples from the magazine when its forward end is opened to clear the throat or for other purposes.

Another object is to provide a hinged door or gate at the front of the staple-magazine which may be swung open and resiliently held in open position so that if desired the staples may be loaded into the forward end of the magazine.

Further objects of the improvement are set forth in the following specification which describes a preferred form of construction of the stapling machine as illustrated by the accompanying drawings. In the drawings:

Fig. 6 is a transverse sectional view of the fore part of the machine taken on line 6—6 of Fig. 10 as viewed from the rear and showing the staple-driver raised above a staple supported in position to be driven;

Fig. 7 is a similar sectional view taken in the same plane as Fig. 6 and illustrating a staple as supported by the anvil engaging under its central loop with the staple-driver partly descended to engage the looped upper portions of the legs of the staple;

Fig. 8 is a similar view taken in the same plane as Fig. 6 and showing the staple-driver immediately before it completes its downward stroke to finally effect the clinching of the legs of the staple;

Fig. 9 is a similar view taken in the same plane as Fig. 6 and showing the staple-driver at the end of its descent with the staple-supporting anvil retracted and the head or crown of the staple substantially flattened against the material being stapled with its legs clinched in overlapping relationship;

Fig. 10 is a longitudinal sectional elevational view of a portion of the forward part of the stapling machine taken on line 10—10 of Fig. 6 and showing the staple supporting anvil and the slidable plunger for frictionally engaging the staple to hold it above the anvil;

Fig. 11 is a similar view taken on line 11—11 of Fig. 7 and showing the slidable plunger with its head engaged against the rearward face of the staple-driver;

Fig. 12 is a similar view taken on line 12—12 of Fig. 8 and showing the parts in substantially the same relationship with the staple-driver near the end of its descent;

Fig. 13 is a similar view taken on line 13—13 of Fig. 9 and showing the staple-driver at the end of its descent with the anvil-member rocked to release its lip from under the loop of the staple;

Fig. 14 is a perspective view of the door or gate at the front of the magazine;

Fig. 15 is a perspective view of the rockable anvil-member;

Fig. 16 is a perspective view of the retainer for preventing the escape of staples from the magazine;

Fig. 17 is a perspective view of the staple-driver; and

Fig. 18 is a perspective view of the slidable plunger.

Figure 1:
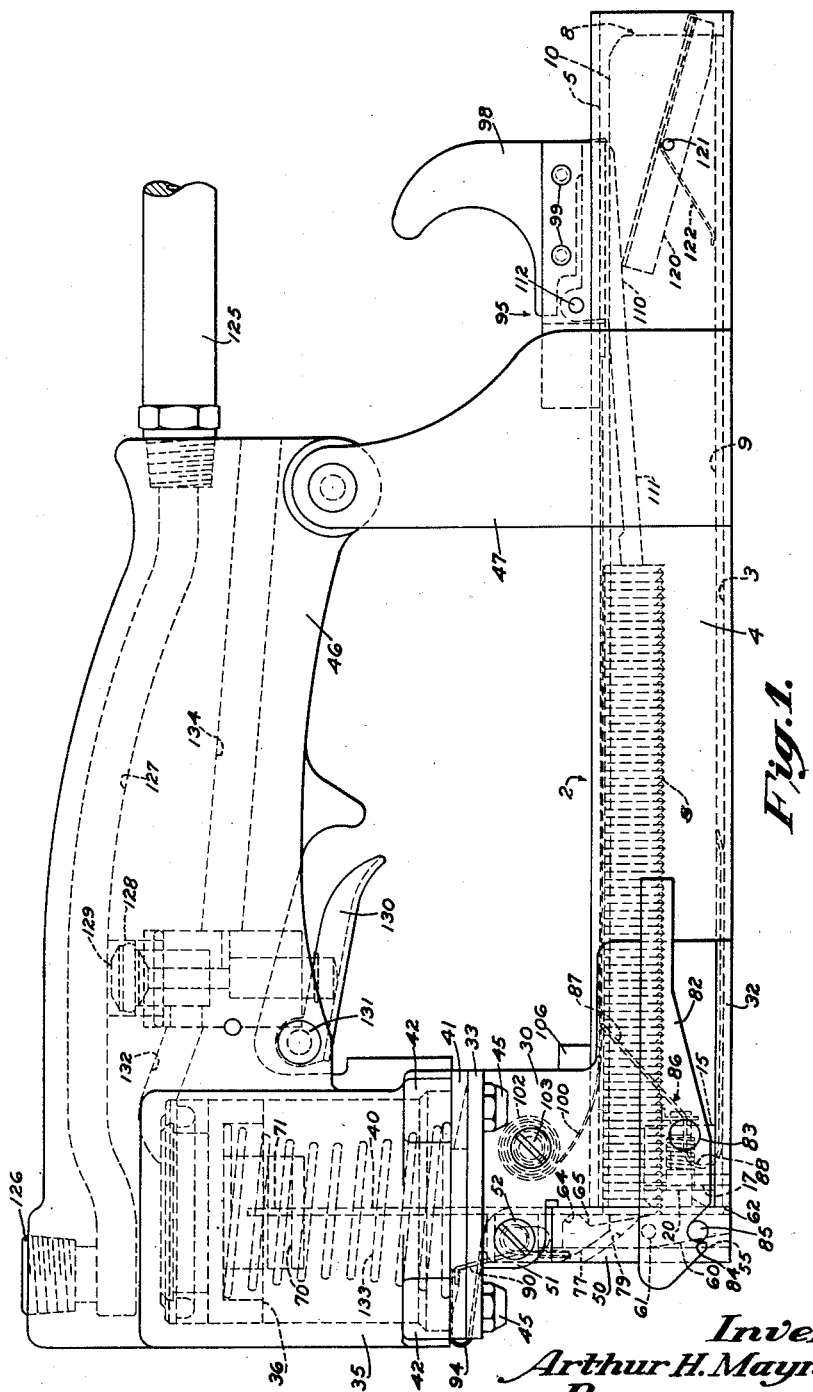
Fig. 1 is a side elevational view of the complete machine showing the front door or gate closed against the front of the magazine and the foremost staple in position to be driven through the throat of the machine.

The present machine is primarily designed for sealing boxes, cartons and like containers by applying staples to the folded flaps or other closure parts thereof and clinching their legs on the opposite side within the interior of the container either under the lower flaps or in the material without protruding therethrough. The present improved machine is capable of applying staples having legs of varying lengths, those with the shorter legs being applied with the ends of the legs clinched within the material of the flaps or cover of the container, while longer staples may be used with the legs driven through two or more layers of the material and clinched on the inner side thereof. Staples of previously-known peculiar shape are employed for sealing containers by the method above explained, such staples being formed from wire or strip-material with their opposite legs inclined outwardly and then bowed inwardly at the ends. The head or bridge of the staple is bent downwardly at the center to form a depending V-shaped intermediate portion with the upper lengths curved or arched to merge into connection with the upper ends of the legs. This type of staple is thus of substantially M-shape with its legs extending downwardly beyond the intermediate V-shaped central portion of its head or bridge and usually the inner bowed ends of the legs are sharpened by beveling them on different sides of the legs. This type of staple has long been used in the art for sealing fiber-board boxes, cartons and other containers with what is sometimes called a "blind stitch," a retractible anvil being employed for engaging under the depending V-shaped central portion of the head of the staple to sustain it and resist the tendency to flatten the bridge as the staple legs are driven down through the material and caused to be bent inwardly toward each other to clinch their ends in overlapping relationship. The anvil must be withdrawn from under the depending bridge-portion of the staple before the final clinch is made so that the bridge may ultimately be flattened to lie close against the surface of the material into which the staple is driven.

Means have heretofore been provided in stapling machines for performing the above described operations and the present invention consists in improvements in the construction thereof by simplifying the mechanism and rendering it less liable to wear and derangement, while also reducing the cost of manufacture of the machine. The present invention consists in a novel form of staple-sustaining anvil, a new and improved means for feeding the staples in the magazine, and also includes means for more convenient loading of the staples into the magazine. A hinged door is mounted at the forward end of the magazine with means for retaining it in open position to provide for clearing the throat of the machine when it becomes clogged by malformation or distortion of the staples; all of these several features mentioned above being a part of, or combined with, the magazine of the machine.

Figure 3:
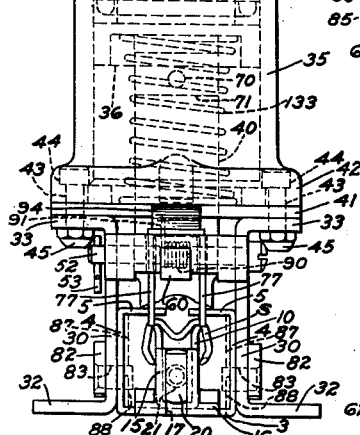
Fig. 3 is a front elevational view of the machine in the same scale as Fig. 2 with the staple-retaining means shown in detail.

Referring to the drawings, the machine as herein illustrated comprises a hollow trough-shaped magazine 2, preferably constructed from sheet-metal with a flat bottom 3, vertical side walls 4 folded upwardly therefrom, and inturned flanges 5 at the top projecting toward each other with their opposed edges spaced at a distance apart. Extending longitudinally within the magazine 2 is a staple-supporting core 8 constructed of sheet-metal and formed in substantially U-shape with a bottom 9 and upstanding vertical sides 10 for adapting the staples to be straddled thereacross and slidably fed therealong. It will be noted by reference to Fig. 3 that the sides of the core 8 are bent or curled outwardly at the top to adapt the upper looped portions of the staple-legs to slide smoothly thereon. The core 8 may be welded or otherwise suitably fastened to the bottom 3 of the magazine 2 with its forward end extending substantially to the end thereof, this end of the core being closed by a block-like element 15 (Fig. 10) having its rearward portion seated on the bottom of the core and its forward portion projecting downwardly therefrom to provide a shouldered joinder therewith. The forward shouldered portion of the block 15 is provided at either side with laterally-extending feet 16 (Fig. 3) and in the front of the block is a vertical slot 17 (Fig. 10) for slidably receiving the rectangular head 20 (Fig. 18) of a cylindrical plunger 21. The plunger 21 is slidably mounted in a counter-bore 22 in the block 15 with a spring 23 encircling its reduced shank 24 and bearing at one end against a shoulder at the rear of its head 20 with its rearward end engaging against the end of the bore 22. A spring-washer or clip 25 is inserted in a groove in the rearward end of the shank of the plunger 21 to limit its forward sliding movement under the tension of the spring 23. The upper face of the plunger head 20 is beveled at 27 for a purpose later explained. Suitable pins 28 extend laterally through holes in the block 15 with their ends riveted through the sides of the core 8 to fasten the block in place.

At the forward end of the magazine 2 a pair of plate-like members 30 (Figs. 1 and 3) are welded or otherwise suitably secured to the side walls 4 of the magazine and formed at the bottom with laterally-extending flanges 32 which provide feet adapted to rest against the work. The upper ends of the plates 30 are bent at right-angles to form lateral flanges 33 for mounting the superstructure of the machine thereon which may comprise a cylinder 35 containing a piston 36 for actuating the driver-blade 40. A rectangular plate 41 is positioned between the flanges 33 and the bottom of the cylinder 35 which is formed with bosses 42. Bolts 43 (Fig. 3) inserted through alining holes in these parts have their heads 44 countersunk in the bosses 42 with nuts 45 on their lower ends set up against the flanges 33 to fasten the cylinder 35 in place. The cylinder 35 is formed integral with a handle-extension 46 projecting rearwardly therefrom and supported at its end by a brace 47 welded or otherwise suitably secured to the side of the magazine 2 with its upper end bolted to a boss at the end of the handle. These last-named elements of the machine, briefly described hereinafter, are constructed to contain the power-means, either pneumatic or hydraulic, for actuating the piston 36 to carry the staple-driver 40 down in driving a staple into the work. It is to be understood, however, that the staple-driving means may be operated in any other manner for example, manually by a hand-lever.

The side plates 30 form a mounting for the closure-gate or door 50 at the front of the magazine 2 and for this purpose they are formed with forwardly-projecting ears 51 through which extends a headed pin or bolt 52 held in place by a cotter-pin 53 at one end. The gate 50, shown in perspective view (Fig. 14), has upstanding ears 54 apertured to receive the hinge-pin 52 for pivotally mounting it with its lower portion abutting the front of the magazine 2 at the sides thereof. The greater portion of the inner face of the gate 50 is recessed inwardly from its sides and formed with a central slot-like channel 55, at either side of which are narrower vertical slots 56. The central slot 55 is adapted to receive an anvil-member 60 (Fig. 15) pivotally mounted therein. The anvil-member 60 is pivoted on a pin 61 having its ends held in holes in the sides of the channel 55, thereby adapting it to rock within predetermined limits for a purpose later explained. At its lower end the member 60 is formed with a projecting lip 62 which forms the anvil proper for engagement under the V-shaped bend or loop in the bridge of the staple s, see Figs. 7 and 11. The lip 62 is beveled or inclined downwardly slightly toward its end to adapt the crossbar or head of the staple to slide off therefrom as the head is finally flattened against the work at the completion of the driving stroke of the driver 40. The anvil-member 60 tapers downwardly from its center to the top of the lip or anvil-projection 62 and also from its center upwardly toward the top where it is provided with a cam-shaped protuberance 63. The cam 63 has a narrow flat forward face with a beveled portion 64 at the top and an oppositely beveled face 65 therebelow.

The cam 67 on the driver-blade 40 serves as the means for rocking or pivoting the anvil-member 60 by cooperation with the driver-blade 40 (Fig. 7) as the blade descends to drive the staple. For this purpose the driver-blade 40 is formed with a central opening 66 having a curved upper edge and a beveled horizontal lower edge 67 which engages with the cam 63 on the anvil-member 60 in the manner as later explained. It is further to be noted that the driver-blade 40 has its lower edge recessed arcuately at the center with slightly inclined portions 68 extending laterally therebeyond which are adapted to engage across the curved upper portions of the legs of the staple s as shown more particularly in Figs. 7 and 8. The driver-blade 40 has a hole 69 adjacent its upper end for attaching it to the piston 36 by means of a pin 70, the blade fitting in a slot 71 in the lower reduced portion 72 of the piston, see Fig. 2. The rearward face of the blade 40 is formed with a relatively shallow recess 73 (Figs. 6 and 13) extending downwardly from the opening 66 and of a width to adapt it to receive the head 20 of the plunger 21 in a manner and for the purpose later explained.

The two narrow slots 56 at the sides of the channel 55 in the gate 50 are adapted to receive a staple-retaining member 75, shown in perspective view, Fig. 16, which is of generally inverted U-shape with a flat upper crosspiece 76 and opposite parallel legs 77 depending therefrom. The lower portions of the legs 77 are narrowed toward their bottom ends by means of curved rearward edges to adapt the legs to clear the curved rearward walls of the slots 56 which may be formed by a circular milling-cutter as indicated at 79. Extending vertically in each leg 77 of the member 75 is a slot 80 through which the hinge-pin 52 projects for slidably mounting the member in the slots 56 in the gate 50.

Figure 5:
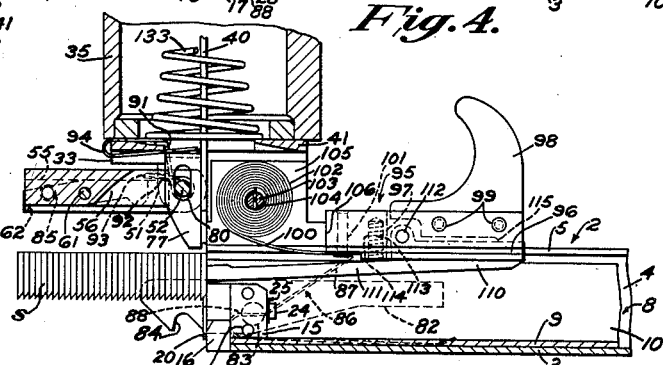
Fig. 5 is a similar vertical sectional view of the front portion of the machine showing the magazine gate open and the staple-retaining means raised to permit the staples to be entered into or be removed from the magazine.

The gate 50 is normally fastened in closed relationship against the front of the magazine 2 by means of a pair of manually-operable latch-levers 82 mounted on the ends of studs 83 journaled in holes in the sides of the plates 30. The levers 82 have hooks 84 at their forward ends adapted to engage around pins 85 which project from the sides of the gate 50 (Fig. 1) for locking the gate in closed position. The pivot-pins 85 for the levers 82 are held in place in the holes in the side plates 30 by means of wire springs 86 passing through holes in the inner ends of said pins. Referring to Fig. 5, the spring 86 is formed with an angular leg 87 having its end engaging under the flange 5 on the side of the magazine 2 with a portion bent therefrom and inserted through a hole in the end of each pin 83, the wire of the spring being continued in a circular bend 88 and extending along the bottom or floor of the magazine 2 to hold the spring under tension. Each spring 86 thus has two functions; first, to secure the pivot-pin 83 in place, and secondly, tending to rotate the pin to normally hold the latch-lever 82 in the position illustrated in Figs. 1 and 2 with its hooked end engaging the pin 85 at the side of the gate 50. It will be noted that the forward or nose ends of the levers 82 are rounded and beveled at an angle on the under side adjacent their slots 84. This construction provides that when the gate 50 is swung down against the end of the magazine 2 the pins 85 will ride along the inclined or beveled portions of the levers to cam their hooked portions 84 upwardly whereby they will be engaged with the pins to latch the gate in closed relationship.

The gate 50 is adapted to be swung open automatically when released from the latch-levers 82, a part-helical spring 90 being employed for this purpose. The spring 90 is coiled around the hinge-pin 52 (Figs. 3 and 4) with one leg 91 extending upwardly from the coil and bent angularly to engage in a groove in the plate 41 which underlies the cylinder 35. The opposite leg 92 of the spring 90 is held in a small bore 93 at the upper end of the gate 50 (Fig. 14). The tension of the spring 90 is exerted to rock the gate 50 upwardly into the position shown in Figs. 3 and 4 and hold it open either for inserting a stick of staples into the magazine or for clearing the throat through which the staples are driven in case it becomes clogged by a malformed staple.

Figure 4:
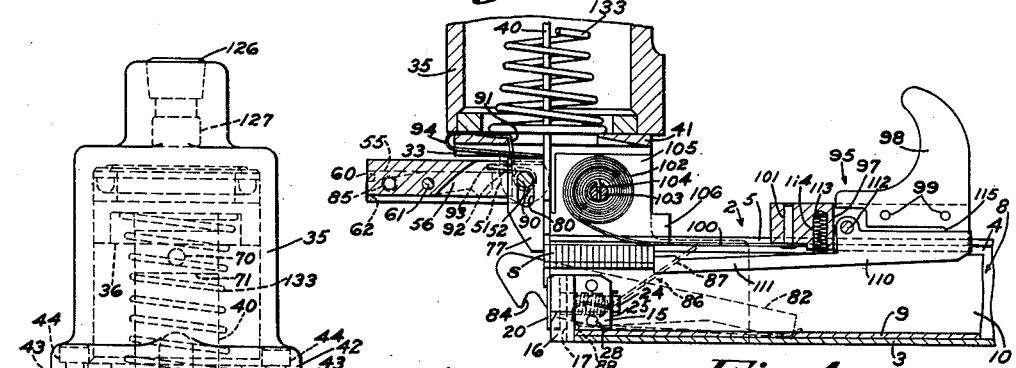
Fig. 4 is a vertical sectional view of a portion of the front end of the machine showing the hinged gate swung open and the staple-retaining means in operative position to prevent escape of the staples from the magazine.

It has been stated that means are provided for preventing escape of the staples from the forward end of the magazine 2 when the gate is opened and such means consist in a staple-retainer 75 (Figs. 4 and 16). The staple-retainer 75 is mounted on the hinge-pin 52 for the gate 50 with its legs 77 in the slots 56 of the gate to adapt it to slide up and down within limits imposed by the ends of the slots 80 through which the pin 52 engages. The staple-retainer 75 is normally held in its lowermost position as illustrated in Fig. 4 by a hairpin-shaped spring 94 having one leg engaged in a groove in the plate 41 which underlies the cylinder 35 and its longer leg reaching rearwardly from its bent portion to engage across the flat top of the crossbar 76 of the retainer. The arrangement is such that if it is desired to load staples into the forward end of the magazine, or to remove them therefrom, the staple-retainer 75 may be lifted and held raised by pressing the finger under its lower end (Fig. 5). It will be understood that the staple-retainer 75 is so located that the driver-blade 40 reciprocates in the space between its legs 77 and the end of the magazine 2.

The staples s are fed forwardly on the core 8 in the magazine 2 by means of a pusher 95 of more or less conventional type adapted to slide along the magazine. The pusher 95 may be constructed from a rectangular metal block provided with grooves 96 extending longitudinally of its sides for engagement with the edges of the flanges 5 at the top of the magazine 2. A central slot 97 extends from the rearward end of the pusher 95 throughout substantially three-quarters of its length and mounted therein is the lower portion of a finger-pull 98 fastened by pins or rivets 99 and adapted to be grasped for drawing the pusher rearwardly. A flat spring 100 is attached to the forward end of the pusher 95 on its under side by means of a rivet 101, the forward length of the spring being wound into a coil 102 in the manner of a watchspring and mounted on a spindle 103 with the end of the spring engaging in a slot 104 therein. The coil 102 is held between side plates 105 which line the cavity between the side plates 30 at the front of the machine. Each side plate 105 is provided with a rearwardly-extending lug 106 adapted to engage the forward end of the pusher 95 to limit its motion under the tension of the spring 100.

Pivotally mounted within the slot 97 of the pusher 95 is a pawl-like member 110 which extends forwardly in a relatively long arm 111 with its end adapted to engage against the central loop of the rearmost staple in the strip or stick to feed the staples forwardly. The pawl 110 is pivoted on a pin 112 held in the sides of the pusher 95, a helical spring 113 pocketed in a bore 114 on the under side of the pusher 95 being adapted to rock the pawl to normally incline its arm 111 downwardly to the position shown in Fig. 4. The shorter rearward arm of the pawl 110 is adapted to engage a step 115 at the end of the finger-pull 98 to limit the downward rocking motion of the arm 111 at its forward end.

Figure 2:
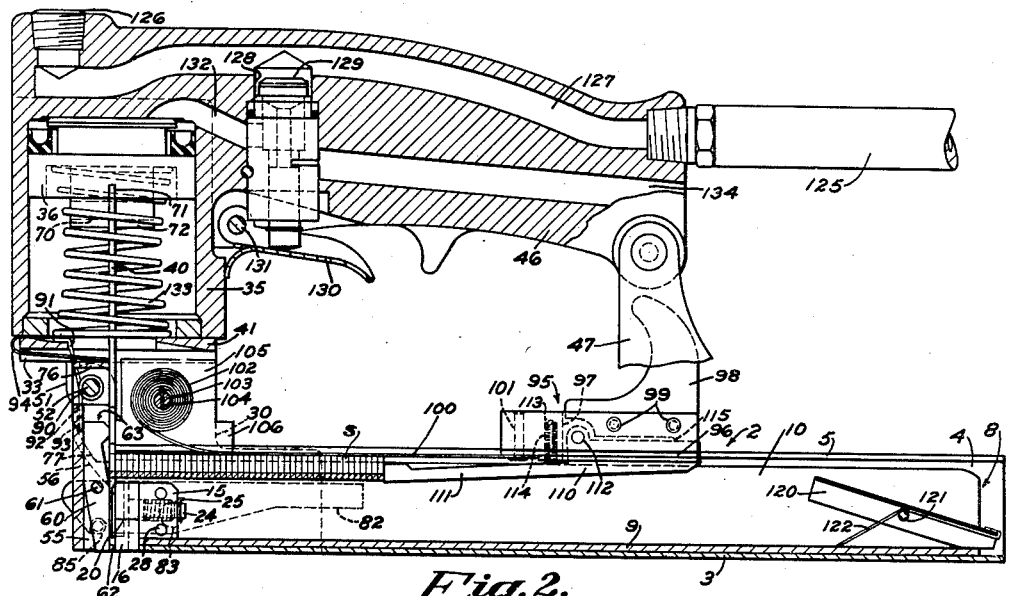
Fig. 2 is a longitudinal sectional view of the complete machine in slightly reduced scale showing its magazine loaded with staples and the staple-applying means positioned for operation.

Referring to Fig. 2, a rockable member 120 in the nature of a detent-pawl is provided within the rearward end of the magazine 2, being of inverted channel-shape and pivotally mounted on a crosspin 121 extending through the sides of the core 8. A flat leaf-spring 122 extends across the top of the pivot-pin 121 with its forward leg engaging against the bottom wall 9 of the core 8 and its rearwardly-extending leg hooked around the edge of the top portion of the member 120. The spring 122 acts to normally maintain the member 120 in the relationship shown in Fig. 2, while permitting its forward end to rock downwardly. The detent-pawl 120 serves as a stop to prevent the staples from sliding out through the rearward open end of the magazine 2 when the staple-pusher 95 is withdrawn with its pawl 110 sliding through the staples on the core 8 after the magazine has been loaded with staples with the pusher 95 in its forward position.

Air under pressure is supplied to the cylinder 35 of the machine through a flexible hose 125 connected to the rearward end of its handle-portion 46; or in other cases, if more convenient, the hose may be connected to the forepart of the machine above the cylinder 35 by removing the screw-plug 126. The air-hose 125 communicates with a conduit 127 from which a passage 128 leads to a poppet-valve 129 actuated by a trigger 130 pivoted at 131 on the under side of the handle 46. The valve 129 is preferably of the quick-opening type such as illustrated and described in a copending U. S. application, Serial No. 393,347, filed by Robert W. Jenny, November 20, 1953, and issued as U. S. Letters Patent No. 2,714,208 on August 2, 1955. Suffice it to state herein that a port 132 leads from the air-valve 129 into the upper end of the cylinder 35 to supply pressure for depressing the piston 36 and thereby sliding the driver-blade 40 downwardly to drive a staple through the throat between the closed gate 50 and the forward end of the magazine 2. A helical spring 133 encircling the driver-blade 40 and seated on the plate 41 acts to return the piston 36 to the upper end of its stroke after it has completed the driving and setting of a staple in the work. As the piston rises air is exhausted from the bore of the cylinder 35 through the port 132 and thence through the valve 129 to discharge into the atmosphere from the end of an exhaust passageway 134. Other means besides those herein shown and described may be employed for actuating the staple-driver 40, for example a suitable lever adapted to be operated manually or by power means.

The method of loading the machine with staples and the manner in which it operates to drive and clinch the staples in the work is explained as follows: It has been stated that the magazine 2 may be loaded at its forward end by opening the gate 50 and raising the staple-retainer 75 as shown in Fig. 5, but usually the most convenient method is to insert the staples through its rearward end. A suitable number of staple-strips or sticks having the staples joined together therein may be inserted into the rearward end of the magazine 2 by sliding them in straddled relation on the core 8 underlying the flanges 5, the rearward end of the sides of the core being preferably beveled or rounded off to provide a re-entrant opening for the staples. The staples may be loaded into the magazine 2 with the staple-pusher 95 located at its forward end, as indicated in Fig. 5, after all the staples have been exhausted therefrom; or with the pusher at any other location along the magazine. As the staples are slid along the core 8 they will ride over the raised end of the detent-pawl 120 to depress its forward end against the tension of the spring 122. As the staples continue to slide forwardly with the addition of more sticks they will ride under the pawl 110 on the pusher 95 to raise the forward end of the pawl.

After a number of sticks of staples have been loaded into the magazine 2 in the manner explained, usually in sufficient number to substantially fill the magazine, the pusher 95 is withdrawn toward the rearward end of the magazine as shown in Fig. 1. During this retraction of the pusher 95 the spring-controlled pawl 110 will ride through the staples with a sort of ratchet action until the end of the arm 111 of the pawl is released to engage the endmost staple in the magazine. During this retraction of the pusher 95 any tendency for it to force the staples rearwardly and out through the end of the magazine 2 is resisted by the action of the detent-pawl 120 engaging with the rearmost staple in the series; it being necessary in most cases to withdraw part of the pusher beyond the rearward end of the magazine to insure that the end of its pawl 110 will engage with the rearmost staple in the series on the core 8. Then when the pusher is released the reaction of the coil 102 at the forward end of the spring 100 will draw the pusher forwardly so that the end of the pawl 110 engaging with the rearmost staple in the series (Fig. 1) will feed all the staples forwardly to advance the foremost one into the throat between the gate 50 and the end of the magazine 2. It will be understood that at this juncture the gate 50 is latched in closed relationship by the levers 82 with the parts in the position shown in Fig. 10; the head 20 of the plunger 21 being projected into extreme forward position under the action of the spring 23 as limited by the engagement of the spring-clip 25 (Fig. 10) with the end of the block 15. Also at this juncture the lower end of the anvil-lever 60 will have been rocked forwardly with its lip 62 projected across the staple-throat while the legs 77 of the staple-retainer 75 are completely received in the slots 56 of the gate 50. The several parts of the staple-applying means are now in proper relationship for operation, the piston 36 being raised with the driver-blade 40 at the upper end of its stroke.

The operator holds the machine by gripping his fingers around the handle 46 with one finger in position for rocking the trigger 130 to open the valve 129 for admitting air-pressure into the cylinder 35 and applying it to the piston 36. The piston 36 is thus caused to descend to slide the staple-driver 40 downwardly for driving the foremost staple held in the throat between the end of the magazine 2 and the gate 50. As the driver 40 descends and the staple $s$ is forced downwardly in the throat its intermediate looped bridge-portion will ride across the upper beveled face 27 on the head 20 of the plunger 24 to slide the plunger rearwardly. Then as the driver 40 continues its descent and the staple is carried further down in the throat the head 20 of the plunger 24 will bear against its rearward side under the tension of the spring 23 to apply sufficient friction for preventing the staple from dropping down away from the driver or being displaced in the throat. In this way the staple $s$ is held frictionally from moving endwise or canting so that it will be driven properly as the ends of its legs meet the work. The purpose of the recess 73 in the rearward face of the driver 40 will now be understood, this recess allowing the head 20 of the plunger 24 to advance thereinto (Fig. 13) so as to insure that when it is retracted by the staple the spring 23 will have sufficient force to maintain its head in frictional engagement with the staple across its intermediate loop.

It has been stated that as the driver 40 descends in the throat the anvil member 60 is positioned as shown in Figs. 10 to 12 with its lip 62 projected across the throat. Consequently, as the staple is driven down into the position shown in Fig. 7 its central looped portion will engage with the anvil-projection or lip 62 (Fig. 8) to sustain the staple until its legs have penetrated into the material and been clinched by the further descent of the staple-driver 40. The anvil-member 60 is maintained with its lip 62 advanced by the engagement of the driver 40 with the flat forward face of its cam 63. When, however, the driver 40 has descended sufficiently to aline its opening 66 with the cam 63 as shown in Figs. 8 and 12, the cam 63 will ride through the opening as shown in Fig. 13 to permit its lower portion to swing rearwardly and release the staple at the last end of the stroke of the driver. Stated another way, the force of the driver against the head of the staple will cause it to ride off from the lip 62 as the member 60 rocks about its pivot 61. Finally, as the driver reaches the end of its downward stroke the bridge or crossbar of the staple is flattened as shown in Fig. 9 so as to render it substantially flush with the top of the material or carton flap $f$; it being noted by reference to Figs. 8, 12 and 13 that under the pressure of the machine against the work the anvil-member 60 is caused to indent the surface of the material of the flap or other closure as shown at $d$ so that the head of the staple will lie in the indentation. To secure this action of the anvil-member 60 for indenting the material, its length is so dimensioned as to adapt it to project slightly beyond the bottom of the magazine 2 and the lower end of the gate 50.

After the staple $s$ has been driven into the material of the carton and clinched either therein, or against the under side of the bottom flap, the trigger 130 is released to operate the air-valve for relieving the pressure in the upper end of the cylinder 35 and allow it to exhaust through the passage 134. The spring 133 will then expand to raise the piston 36 and thereby return the staple-driver 40 to the upper end of its stroke. As the driver-blade 40 moves upwardly the beveled edge 67 of its opening 66 engages the inclined face 64 of the cam 63 on the anvil-member 60 to rock the upper end of said member rearwardly and project its lip 62 forwardly across the staple throat.

It has been explained that when the gate 50 is opened as shown in Fig. 4 the staple-retainer 75 will normally be depressed into the position shown in Fig. 4 by its spring 94 so that the lower ends of the legs 77 of the retainer will be engaged with the head of the staple s at its ends (Figs. 3 and 4) to prevent the staple from being ejected out of the magazine by the pusher 95. The staple-retainer 75 may be raised manually to the position shown in Fig. 5 to clear the throat should a staple become jammed therein or in other cases to either remove the residue of staples from the magazine or place a new supply therein.

It will be observed from the foregoing specification that the present invention provides an efficient machine for applying staples to the flaps of cartons and other containers to seal their closures without requiring the insertion of an anvil-blade into the container for clinching the legs of a staple. The present machine also provides for greater convenience in loading its magazine with staples and further embodies a door or gate for opening the forward end of the magazine and a retainer for preventing the staples from being ejected from this end of the magazine when the gate is opened.

While the machine is herein shown and described as embodying a preferred form of construction and adapted for operation by pneumatic pressure, it is to be understood that the structure and arrangement of the parts of the device may be varied and its method of operation altered without departing from the spirit or scope of the invention. Therefore, without limiting myself in this respect, I claim:

1. In a stapling machine having a throat through which the staples may be driven, means for supporting staples of a type having the crossbar formed with a depending portion intermediate the legs, means for feeding the staples singly into said throat, a driver-blade slidable in said throat for driving a staple therethrough and into the work, a pivoted anvil-member having a lip projecting from its lower end, said anvil-member provided with means engageable by said driver-blade during its descent for driving a staple whereby to hold said anvil-member pivoted into position with its lip projecting across the lower end of said throat to engage the intermediate depending portion of a staple for sustaining it while its legs are driven into the work and clinched in overlapping relationship.

2. In a stapling machine having means for supporting a plurality of staples of a type having inwardly-bowed legs and a depending looped portion of the crossbar connecting said legs, a throat through which the staples may be driven, means for progressively feeding the staples singly into said throat, an anvil-member pivoted at the front of said throat and formed with a lip projecting forwardly from its lower end for engagement with the intermediate depending portion of the head of a staple, and means to rock said member to project its lip across the bottom of the throat to sustain a staple while its legs are being driven into the work and clinched as its head or crossbar is flattened.

3. In a stapling machine having a magazine for containing staples of a type formed with inwardly-bowed legs and an intermediate portion of its head depending in a central loop, a closure-abutment at the front of said magazine forming a throat through which the staples may be driven, a driver-blade for driving the staples through the throat and into the work, and an anvil-member pivoted in a slot in said closure-abutment and formed at its lower end with a lip, said driver-blade being engageable with said anvil-member to maintain it in position with its lip projecting across said throat for engagement under the intermediate loop of a staple while its legs are being driven into the work, said anvil-member being releasable from said driver-blade as the latter completes its descent in the throat whereby to permit it to withdraw its lip from said throat after the legs of the staple have been clinched and its bridge flattened against the work.

4. In a stapling machine having a magazine for supporting staples of a type having inwardly-bowed legs and a loop depending from its crossbar intermediate said legs, a closure-element abutting the open front of said magazine and formed with a throat through which the staples may be driven, said closure-element having a vertical slot, an anvil-member pivoted in said slot and formed with a lip at its lower end located in a position to project across the staple-throat for engaging under the central looped portion of the staple to sustain it while its legs are being driven into the work and clinched, and means for causing said anvil-member to be rocked to withdraw its lips from under a staple after its legs have been clinched and its crossbar is flattened against the work.

5. In a stapling machine having a magazine for containing substantially M-shaped staples having inwardly-bowed legs and a depending loop in its crossbar intermediate said legs, a hinged door abutting the open forward end of said magazine and provided with a throat through which the staples may be driven, said door also provided with a central vertical slot, an anvil-member pivoted in said slot in the door to allow it to rock forwardly and rearwardly therein, said anvil-member having a lip at its lower end adapted to be projected across the bottom of the staple-throat, means for normally maintaining said anvil-member rocked with its lip positioned in the throat for engaging under the central loop of a staple to sustain it while its legs are driven, and means for releasing said anvil-member to adapt it to rock and withdraw its lip from the staple-throat as the legs of the staple are driven into the work and clinched and the head of the staple is finally flattened against the work.

6. In a stapling machine having a throat through which the staples may be driven, means for supporting staples of a type having inwardly-bowed legs and a depending V-shaped loop in the crossbar connecting said legs, means for feeding said staples singly into said throat, an anvil-member pivoted at the side of said throat and formed with a projecting lip at its lower end for engaging under the depending loop in the head of a staple to sustain it while its legs are being driven into the work and clinched, means for normally retaining said anvil-member with its lip projected across the lower end of the throat, and means for releasing said retaining means after the legs of the staple have been driven into the work to cause the anvil-member to withdraw its lip from the throat as the head of the staple is flattened and slid off from the lip.

7. In a stapling machine having a magazine for containing a supply of staples formed with inwardly-bowed legs and a depending loop at the center of the head, a gate pivoted as the open end of said magazine to close thereagainst, said gate recessed on its side to provide a throat through which the staples may be driven and also formed with a central vertical slot, a rockable anvil-member pivotally mounted in said slot and formed with a lip at its lower end located in position to be projected across the staple-throat for engagement with the depending loop in the head of a staple to sustain the latter while its legs are driven into the work, a cam-projection at the upper end of said anvil-member, and means engageable with said cam-projection during the driving of a staple to maintain the anvil-member with its lip positioned across the throat, said anvil-member being releasable when its cam-projection is disengaged for allowing said member to rock to withdraw its lip from the staple as the driving of the staple is completed and its cross-bar is flattened against the work.

8. In a stapling machine having a throat through which the staples may be driven, said throat having a relatively narrow opening on one side, means for supplying staples of a type having inwardly bowed legs connected by a crossbar formed with a depending loop intermediate said legs, means for feeding staples into said throat, an anvil-member pivoted at the front of said throat and formed with a lip at its lower end movable through the opening in the throat to position it across the lower end thereof, said anvil-member having a cam-shaped projection at its upper end, and a driver-blade reciprocable in said throat to drive the staples into the work and engageable with the cam-projection on the anvil-member to hold it with its lip projected into the bottom of the throat, said driver-blade formed with an opening for receiving the cam projection on the anvil-member to release said member and allow it to be rocked to withdraw its lip from the staple as the latter is finally driven and its crossbar flattened against the work.

9. In a stapling machine having a magazine for containing a supply of staples of a type having the crossbar formed with a depending loop intermediate the legs of the staple, a closure at the front of the magazine recessed to provide a throat through which the staples may be driven, said closure formed with a central slot, an anvil-member pivotally mounted in said slot and provided at its lower end with a beveled lip for engaging under the central loop of a staple to sustain it while its legs are driven into the work, said anvil-member having a cam-projection at its upper end formed with oppositely beveled faces, and a driver-blade slidable in the throat for driving the staples into the work, said driver-blade slidably engaging the cam-projection on the anvil-member to hold said member in position with its lip positioned across the staple-throat, said driver-blade formed with an opening through which the cam-projection on the anvil-member enters as the driver-blade approaches the end of its stroke, said opening in the driver-blade having a beveled edge for engaging a beveled face on the cam-projection to rock the anvil-member and project its lip into the staple-throat as the driver-blade moves upwardly in its return stroke after driving and clinching a staple in the work.

References Cited in the file of this patent
UNITED STATES PATENTS

| | | |
|---|---|---|
| 420,074 | Jones | Jan. 28, 1890 |
| 746,967 | Levitt | Dec. 15, 1903 |
| 1,945,377 | Posnack | Jan. 30, 1934 |
| 2,161,449 | Blumenbaum | June 6, 1939 |
| 2,178,354 | Brownstein | Oct. 31, 1939 |
| 2,675,547 | Spencer | Apr. 20, 1954 |